United States Patent [19]
Searles

[15] 3,642,014
[45] Feb. 15, 1972

[54] COMPOUND GOVERNOR VALVE MECHANISM
[72] Inventor: John J. Searles, Northville, Mich.
[73] Assignee: Ford Motor Company, Dearborn, Mich.
[22] Filed: Nov. 24, 1969
[21] Appl. No.: 879,467

[52] U.S. Cl. .............................................................137/54
[51] Int. Cl. ....................................G05d 13/34, F15b 3/00
[58] Field of Search ..............................................137/54, 56

[56] References Cited

UNITED STATES PATENTS 3,048,184   8/1962   Duffy ..................................137/54 X
3,279,486  10/1966   Duffy et al. ...........................137/54
3,322,133   5/1967   Searles .................................137/56

Primary Examiner—Robert G. Nilson
Attorney—John R. Faulkner and Donald J. Harrington

[57] ABSTRACT

A two-stage governor valve mechanism comprising a secondary valve element for producing a governor pressure signal that is related in magnitude to the driven speed of a rotary member with a functional relationship and a primary governor valve element that produces a modulated pressure force on the secondary valve element which modifies that functional relationship at relatively low speeds of the rotary member.

4 Claims, 5 Drawing Figures

INVENTOR:
JOHN J. SEARLES

COMPOUND GOVERNOR VALVE MECHANISM

GENERAL DESCRIPTION OF THE INVENTION

My invention is adapted to be used in control systems for an automatic power transmission for producing a governor speed signal that can be used by shift valve elements in a control system to initiate automatic speed ratio changes. Control systems of this type normally respond to changes in the magnitude of a first pressure signal that is proportional to the engine manifold pressure in the internal combustion engine used with the transmission mechanism or in proportion to engine throttle position, as well as to changes in a second signal that is proportional in magnitude to the driven speed of a driven member of the transmission.

A compound governor valve mechanism capable of being used in an environment of this type is shown in Duffy U.S. Pat. No. 3,048,184 which is assigned to the assignee of my instant invention. That governor valve mechanism includes a primary valve element and a secondary valve element carried by a valve body, which in turn is connected to the driven shaft of a transmission mechanism. Pressure from a control pressure source is distributed to the secondary valve element, which modulates the control pressure to produce an output pressure signal that is proportional in magnitude to the rotary speed of the valve body. The primary valve element at low speeds of rotation inhibits operation of the secondary valve element so that a speed signal is obtained only after the driven member rotates at speeds greater than a predetermined minimum value. The centrifugal forces developed by reason of the mass of the primary valve element at that minimum speed overcomes the opposing influence of radially inwardly directed forces acting upon the primary valve element.

In governor mechanisms of this type, it may be possible for the secondary valve element to fluctuate from an operative position to an inoperative position as the shaft is rotated 180°. This is due to the fact that the weight of the valve contributes to the radially outwardly directed centrifugal forces acting on the primary valve when the valve body is in a position in the transmission housing with the primary valve element below the centerline of the axis of rotation of the output shaft. The direction of the gravity forces acting on the primary valve element are reversed, however, when the valve body is rotated so that the gravity forces acting on the primary valve element are radially inwardly directed. This occurs when the primary valve element is rotated about the axis of rotation of the output shaft.

These gravity forces complement the centrifugal force acting on the primary valve element, and the force that causes the primary valve element to operate then is the sum of the gravity forces and the centrifugal force. Since the gravity forces continuously change direction as the shaft rotates, it is possible for the valve system of earlier designs to become unstable as the inhibiting action of the primary relates is applied and released due to the gravity forces acting on the primary valve element.

This problem is especially noticeable when the rotary speed of the driven member is low. It causes a hunting action so that a fluctuating or unstable speed signal is distributed to the shift valves. Unless the shift valves are calibrated to compensate for this fluctuation in governor pressure forces, repeated upshifts and downshifts with the transmission mechanism may occur when the vehicle is operated within a predetermined speed range with a given throttle setting.

My invention is designed to overcome this hunting condition. It does this by providing a modified inhibiting action whereby the primary valve causes a pressure decay in a bypass passage interconnecting the primary valve and the secondary valve. This decay pressure acts upon the secondary valve during operation at a range of speeds below a predetermined value. At speeds of operation greater than that predetermined value, the feedback pressure produced by the primary valve, which pressure acts upon the secondary valve, assumes a zero value and the output pressure signal of the valve mechanism thus is a function only of the modulating action of the secondary valve without the overriding influence of the primary valve. In such an arrangement, the effect of gravity forces on the primary valve is minimized since a change in the direction of the gravity forces with respect to the direction of the centrifugal forces acting on the primary valve merely causes a decrease in the feedback signal distributed by the primary valve to the secondary valve rather than a signal interruption as is the case in the governor mechanism disclosed in U.S. Pat. No. 3,048,184.

The normal hysteresis action in shift valve mechanisms is sufficient to overrule the tendency of the shift valve elements to downshift upon such a reduction or decay in the feedback signal sent from the primary valve and the undesirable hunting action between an upshift condition and a downshift condition is avoided.

BRIEF DESCRIPTION OF THE FIGURES OF THE DRAWINGS

FIG. 5 is a chart showing the functional relationship between the rotary speed of the governor valve mechanism and the magnitude of the output pressure signal.

PARTICULAR DESCRIPTION OF THE INVENTION

Figure 1:
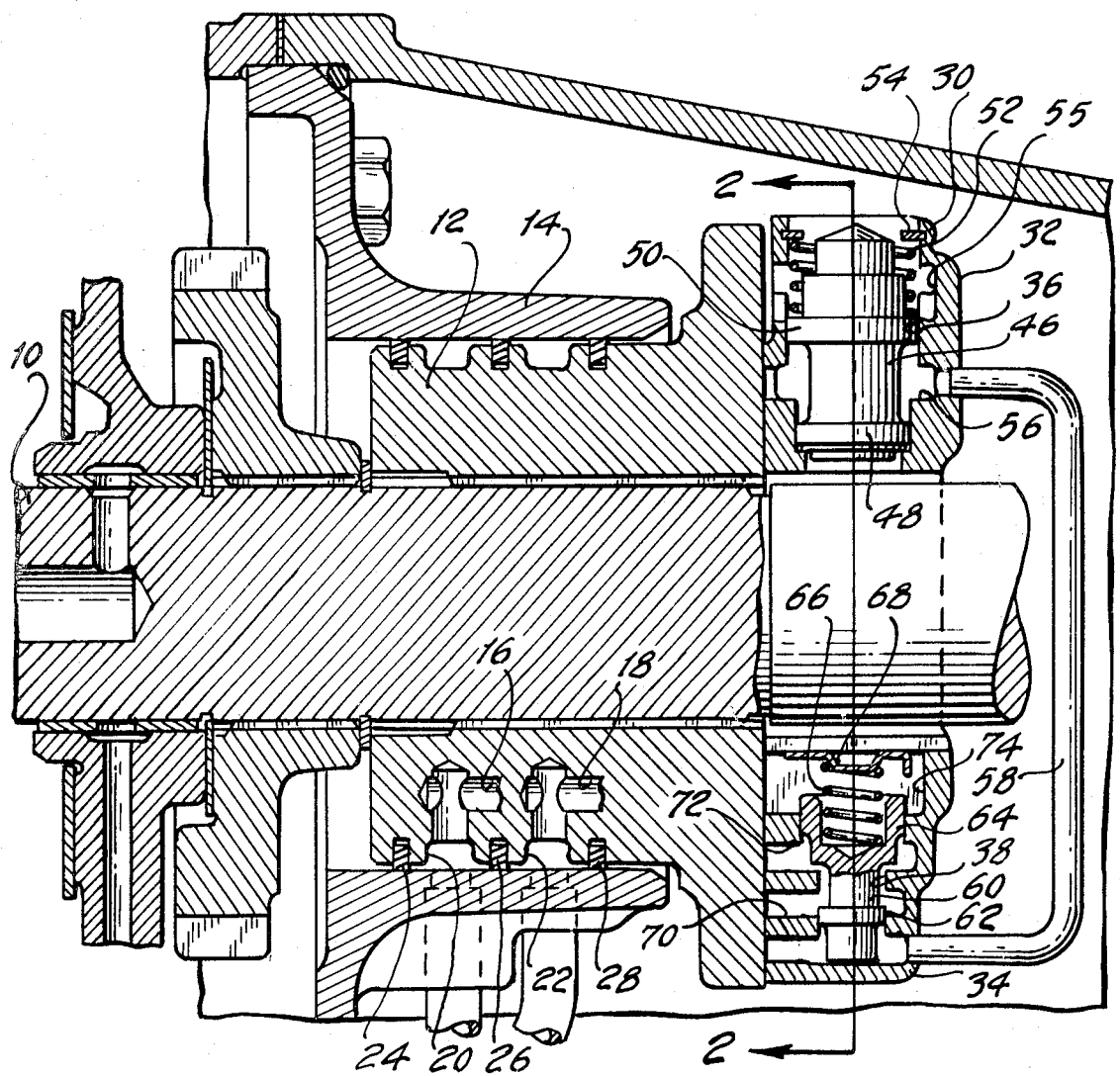
FIG. 1 shows a schematic cross-sectional form, a compound governor valve mechanism embodying the features of my invention.
Figure 2:
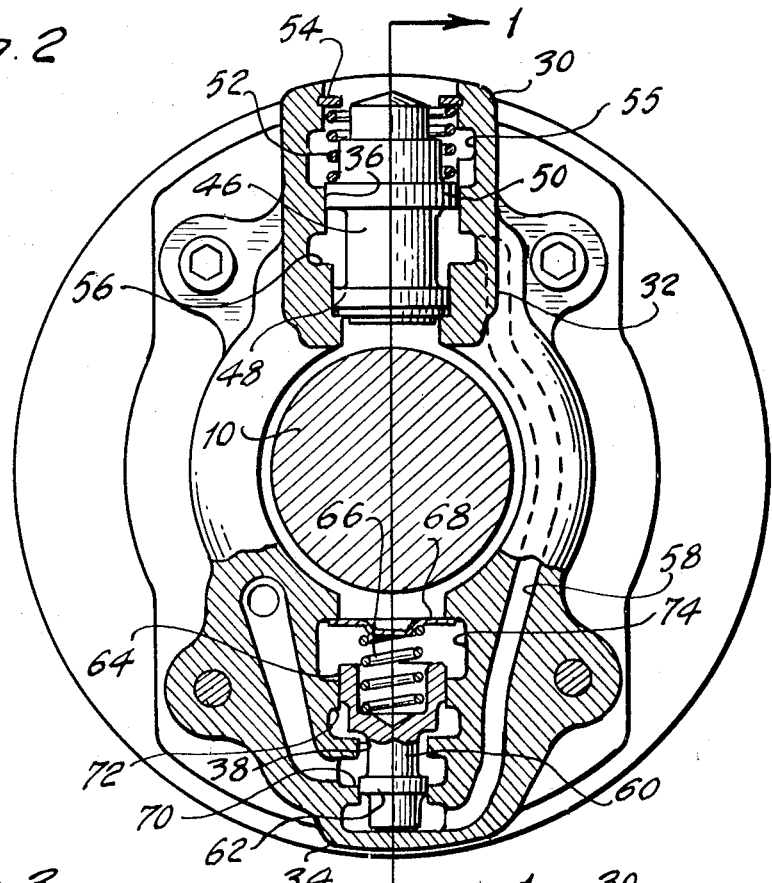
FIG. 2 is a cross-sectional view taken along the plane of section line 2—2 of FIG. 1.
Figure 3:
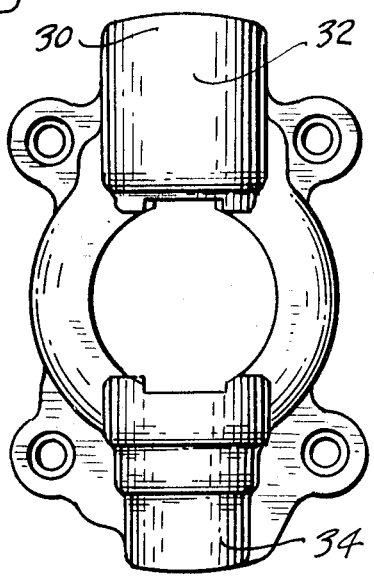
FIG. 3 is an end view showing an isolated portion of the valve body for the governor valve mechanism illustrated in FIG. 1.
Figure 4:
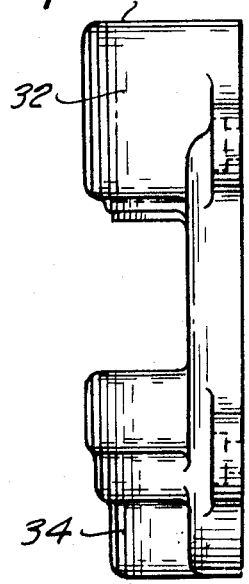
FIG. 4 is a side view of the valve body portion shown in FIG. 3.

Numeral 10 in FIG. 1 shows a driven shaft for a transmission mechanism. Shaft 10 is splined or otherwise secured to a sleeve 12. This may be journaled rotatably in a transmission housing which may include a stationary sleeve 14 around the sleeve 12.

Sleeve 12 is formed with internal passages 16 and 18, the former acting as a supply passage and the latter acting as an output passage for the governor pressure signal. Passage 16 communicates with groove 20 formed in the periphery of the sleeve 12, and passage 18 communicates with groove 22 located directly adjacent groove 20. The grooves are separated and sealed from one another by seal rings 24, 26 and 28.

Valve body 30 is bolted to the end of the sleeve 12. It includes a primary valve portion 32 and a secondary valve portion 34. These valve portions are situated 180° out of position on either side of the axis of rotation of the shaft 10. Each valve body portion 32 and 34 is formed with a radial opening, as indicated at 36 and 38.

A multiple valve land spool 46 is positioned in the valve opening 36. It includes two spaced valve lands 48 and 50, which register slidably with internal valve lands formed in the valve opening 36. Valve element 46 is urged radially inwardly by valve spring 52, which is seated upon valve land 50 and on a reaction ring 54 in the radially outward end of the valve opening 36. It is greater than the diameter of valve land 48. The radially outward part of valve opening 36 communicates with an exhaust port as shown at 55. The portion of the valve opening 36 intermediate the valve lands 48 and 50 communicates with a pressure port 56.

Port 56 communicates with a crossover passage 58, which in turn communicates with radially outward end of valve opening 38. A secondary valve element 60 is slidably positioned in the valve opening 38. It includes a pair of spaced valve lands 62 and 64, the diameter of the land 64 being greater than the diameter of the land 62. A valve spring 66, which is seated on a spring reaction seat 68 carried by the valve body, urges the valve element 60 radially outward. The valve lands 62 and 64 are registered slidably with internal valve lands formed in the valve opening 38.

Control pressure from a control pressure source is distributed to pressure inlet port 70, which communicates with the previously described passage 16. Outlet pressure passage 18 communicates with governor pressure port 72 located intermediate valve lands 62 and 64.

When the valve body is rotated at a speed greater than a predetermined value, primary valve element 46 is urged radially outwardly under the influence of centrifugal force until it seats against the reaction ring 54. At that time, crossover passage 58 is allowed to communicate with exhaust port 55 because valve land 50 uncovers exhaust port 54 when valve element 46 shifts radially outwardly. Crossover passage 58 now acts as an exhaust passage for the secondary valve element.

Control pressure distributed to the secondary valve opening 38 through passage 13 is modulated by the valve element 60 to produce an output pressure in passage 18 that is related functionally to the centrifugal force acting on the valve element 60, which in turn is determined by the speed of rotation of the shaft 10. When the shaft is at rest, the valve element 60 is urged radially inwardly against the opposing force of the spring 66, and passage 18 is brought into fluid communication with exhaust port 74, which communicates with the radially inward part of the valve opening 38. When the shaft 10 is rotated, the centrifugal force acting on the valve element 60 complements the force of the spring 66, and the degree of communication between passage 18 and exhaust port 74 gradually decreases as the degree of communication between passage 16 and the governor pressure passage 18 progressively increases.

When the valve element 60 is in a radially inward position, line pressure is distributed through port 70 to the radially outward end of the valve element 60 thereby urging the valve element 60 in a radially inward direction.

When the speed of rotation of the shaft 10 increases from a value of zero to a value less than a predetermined value, the centrifugal force acting on the valve element 46 modulates the pressure in passage 58. This causes a pressure decay in the passage 58 rather than an abrupt decrease from a maximum value to a zero value. The radially inwardly directed force acting on the valve element 60 thus progressively decreases, and the governor pressure in passage 18 which results in modulating action of the valve element 60 increases at a relatively rapid rate upon an increase in speed.

When a predetermined speed of rotation of shaft 10 is reached, valve element 46 fully uncovers exhaust port 54 thereby exhausting passage 58. At this time, the influence of the primary valve on the secondary valve no longer exists, and the output pressure in the passage 18 is a result only of the modulating characteristics of the valve element 60 rather than the combined influence of the primary and secondary valves. Thus the output pressure signal in passage 18 increases at a lower rate for any given increase in speed of the shaft 10 than the rate of increase that is experienced when the speed of rotation of shaft 10 is less than the predetermined value. This produces a break point in the characteristic curve of the governor. This is illustrated in FIG. 5 where the output pressure signal in passage 18 is plotted as an ordinate and the shaft speed measured in revolutions per minute is plotted on the abscissa.

Having thus described a preferred embodiment of my invention, what I claim and desire to secure by U.S. Letters Patent is:

I claim:

1. A compound governor valve mechanism for producing a pressure signal that is proportional in magnitude to the driven speed of a driven member, said mechanism comprising a valve body carried by said driven member, a pair of valve openings in said valve body, a primary valve element mounted for radial movement in one of said openings, a secondary valve element mounted for radial movement in another of said openings, a source of control pressure, said secondary valve element having two valve lands which register slidably with internal valve lands formed in said other valve opening, the radially inward valve land of said secondary valve element being larger in diameter than the radially outward valve land thereof, a pair of valve lands formed on said primary valve element slidably registering with internal valve lands formed in said one valve opening, the radially outward valve land of said primary valve element being greater than the radially inward valve land thereof, first spring means for normally urging said primary valve element radially inwardly, second spring means for normally urging said secondary valve element radially outwardly, a line pressure passage connecting said pressure source with said other opening at a location intermediate the valve lands of said secondary valve element, a governor pressure port communicating with said other valve opening at a location adjacent the line pressure passage, an exhaust port in said one valve opening at a location radially outwardly of said primary valve element lands and registering with said radially outward valve land, an exhaust port in said other valve opening at a location radially inwardly of said governor pressure passage, and a crossover passage interconnecting the radially outward region of said other valve opening and a portion of said one valve opening intermediate said primary valve element lands, said primary valve element interrupting communication between said crossover passage and its exhaust port when it is positioned radially inwardly and establishing such communication when it is positioned radially outwardly whereby said primary valve element modulates the pressure in said crossover passage, said crossover passage extending to said other valve opening radially outwardly of the smaller valve land of said secondary valve element whereby the pressure force due to the modulated pressure in said crossover passage opposes the force of said second spring means, said smaller valve land on said secondary valve element uncovering said crossover passage to establish increased communication between said crossover passage and said line pressure passage and decreased communication between said line pressure passage and said governor pressure port when said secondary valve element is moved radially inwardly.

2. The combination as set forth in claim 1 wherein said valve body comprises two portions, each valve body portion being situated 180° out of position with respect to the other, the primary valve element and the secondary valve element being urged radially outwardly in opposite directions upon rotation of said power output shaft.

3. The combination as set forth in claim 1 wherein said valve lands of said primary valve element, upon being shifted radially outwardly under the influence of centrifugal force, progressively increase the degree of communication between said crossover passage and the exhaust port located in said one valve opening whereby a decaying pressure is established in said crossover passage, the rate of change in the magnitude of the output pressure signal for a given change in output shaft speed during operation in a low-speed zone below a predetermined speed being greater than the corresponding rate of change for said pressure signal during operation at speeds of rotation greater than said predetermined speed.

4. The combination as set forth in claim 2 wherein said valve lands of said primary valve element, upon being shifted radially outwardly under the influence of centrifugal force, progressively increase the degree of communication between said crossover passage and the exhaust port located in said one valve opening whereby a decaying pressure is established in said crossover passage, the rate of change in the magnitude of the output pressure signal for a given change in output shaft speed during operation in a low-speed zone below a predetermined speed being greater than the corresponding rate of change for said pressure signal during operation at speeds of rotation greater than said predetermined speed.

* * * * *